United States Patent
Chai et al.

(10) Patent No.: US 10,528,378 B2
(45) Date of Patent: Jan. 7, 2020

(54) SYSTEM AND METHOD FOR LOAD ESTIMATION OF VIRTUAL MACHINES IN A CLOUD ENVIRONMENT AND SERVING NODE

(71) Applicant: CHINA UNIONPAY CO., LTD., Shanghai (CN)

(72) Inventors: Hongfeng Chai, Shanghai (CN); Chengrong Wu, Shanghai (CN); Jinzhi Hua, Shanghai (CN); Zhenfang Wang, Shanghai (CN); Yang Yang, Shanghai (CN); Jun Zhang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 290 days.

(21) Appl. No.: 15/512,191

(22) PCT Filed: Sep. 2, 2015

(86) PCT No.: PCT/CN2015/088868
§ 371 (c)(1),
(2) Date: Mar. 17, 2017

(87) PCT Pub. No.: WO2016/045489
PCT Pub. Date: Mar. 31, 2016

(65) Prior Publication Data
US 2017/0286147 A1    Oct. 5, 2017

(30) Foreign Application Priority Data
Sep. 22, 2014    (CN) .......................... 2014 1 0489705

(51) Int. Cl.
*G06F 9/50*    (2006.01)
*G06F 9/455*   (2018.01)
*G06F 9/46*    (2006.01)

(52) U.S. Cl.
CPC ........ *G06F 9/45558* (2013.01); *G06F 9/5077* (2013.01); *G06F 9/46* (2013.01); *G06F 9/5083* (2013.01); *G06F 2009/4557* (2013.01)

(58) Field of Classification Search
CPC ..................................................... G06F 9/5077
See application file for complete search history.

(56) References Cited

U.S. PATENT DOCUMENTS

| | | | |
|---|---|---|---|
| 2007/0192063 A1* | 8/2007 | Abu-El-Zeet | .......... G05B 17/02 702/182 |
| 2009/0031304 A1* | 1/2009 | Song | .................... G06F 9/5077 718/1 |

(Continued)

FOREIGN PATENT DOCUMENTS

| CN | 103092751 A | 5/2013 |
|---|---|---|
| CN | 103475538 A | 12/2013 |

(Continued)

OTHER PUBLICATIONS

Barakbah et al. "Optimized K-Means: an algorithm of initial centroids optimization for K-means", 2005, Seminar on Soft Computing, Intelligent System, and Information Technology (SIIT). (Year: 2005).*

*Primary Examiner* — Jason D Recek
(74) *Attorney, Agent, or Firm* — The Ollila Law Group LLC

(57) ABSTRACT

The application discloses a load evaluation system for virtual machines in a cloud environment, comprising: a monitored data collecting module which is configured to collect monitored data from one or more virtual machines in a cloud data center; a monitored data processing module which is coupled with the monitored data collecting module and is configured to: perform aggregated grouping on the monitored data by using a first KMeans algorithm for each of the one or more virtual machines, each group having a (Continued)

center point coordinate, and calculate a performance characteristic of each virtual machine of the one or more virtual machines according to the grouping and the center point coordinates of individual groups, i.e., a first characteristic value; perform aggregated grouping on the one or more virtual machines using a second KMeans algorithm based on the first characteristic value of each virtual machine, thus determining the characteristic type and performance load value of each virtual machine of the one or more virtual machines. The application also discloses a load evaluation method for virtual machines in a cloud environment as well as a service node.

10 Claims, 1 Drawing Sheet

(56) References Cited

U.S. PATENT DOCUMENTS

| 2012/0101968 A1* | 4/2012 | Banerjee ............. H04L 41/0823 |
| | | 706/21 |
| 2013/0145367 A1 | 6/2013 | Moss et al. |
| 2013/0185729 A1 | 7/2013 | Vasic et al. |
| 2014/0229949 A1* | 8/2014 | Cai .................... G06F 9/45533 |
| | | 718/1 |

FOREIGN PATENT DOCUMENTS

| CN | 103576829 A | 2/2014 |
| CN | 103595780 A | 2/2014 |

* cited by examiner

SYSTEM AND METHOD FOR LOAD ESTIMATION OF VIRTUAL MACHINES IN A CLOUD ENVIRONMENT AND SERVING NODE

The invention relates to cloud monitoring technology, and more specifically, to load evaluation of virtual machines in a cloud environment.

BACKGROUND

The virtualizing technology in cloud computing provides a new concept for the solutions of traditional problems from some aspects. However as a kind of newly emerging technology, the virtualizing technology still suffer from many deficiencies in the work of managing and detecting the performances of virtual machines resources. The author of a paper "Toward an architecture for monitoring private clouds" in 2011 also pointed out the importance of cloud monitoring. While there are many solutions for the management and deployment of cloud, the technology of cloud monitoring still has not kept the pace with times.

The performance characteristic of a system is determined by the characteristic of the system itself and load characteristic of application services running on the system, and it describes a basic system characteristic quantitatively. Therefore, how to determine load characteristics of application services so as to know about the environment in which the entire system is located has an important significance.

Currently, there are no accurate solutions for load evaluations of virtual machines, and most of the solutions determine load states based on an artificial operating state or a macro operating state of virtual machine (e.g., predicting the state of load in the future of a load and its general performance requirements according to the number of users), and load state evaluation is conducted in a relative single and simple way.

SUMMARY OF THE INVENTION

Traditional machine load evaluation typically uses system data of the machine itself to score, and to evaluate the machine itself by pre-set parameters. Such a method is not suitable in a cloud environment since there are a large quantity of virtual machines in the environment, and what the user and the administrator actually requires to know is not only the differences between various virtual machines in terms of performances, but also a relatively accurate macro comparison in the whole for the purpose of knowing occupancies of resource by specific applications.

In order to address the above problem, the application provides a load evaluation system for virtual machines in a cloud environment, comprising: a monitored data collecting module which is configured to collect monitored data from one or more virtual machines in a cloud data center; a monitored data processing module which is coupled with the monitored data collecting module and is configured to: perform aggregated grouping on the monitored data by using a first KMeans algorithm for each of the one or more virtual machines, each group having a center point coordinate, and calculate a performance characteristic of each virtual machine of the one or more virtual machines according to the grouping and the center point coordinates of individual groups, i.e., a first characteristic value; perform aggregated grouping on the one or more virtual machines using a second KMeans algorithm based on the first characteristic value of each virtual machine, thus determining the characteristic type and performance load value of each virtual machine of the one or more virtual machines, wherein a type parameter K in the first KMeans algorithm is larger than a type parameter in the second KMeans algorithm, an initial center of the first KMeans algorithm is selected so that a distance that is as far as possible is kept between initial types, and an initial center of the second KMeans algorithm is selected to be a subset of the initial center of the first KMeans algorithm.

In the above described load evaluation system for virtual machines, the monitored data is associated with a central processing unit, a memory, hard disk input or output, and network input or output of one or more virtual machines.

In the above described load evaluation system for virtual machines, the characteristic type of the virtual machine comprises CPU-intensive type, Network-intensive type and Memory-intensive type.

In the above described load evaluation system for virtual machines, the type parameter K in the first KMeans algorithm is equal to 4, and the type parameter K in the second KMeans algorithm is equal to 3.

In the above described load evaluation system for virtual machines, the initial center of the first KMeans algorithm is selected to be P1 (100,0,0), P2 (0,100,0), P3 (0,0, 100) and P4 (0,0,0).

In the above described load evaluation system for virtual machines, the proportions of samples in each group is A %, B %, C % and D %, and the center coordinates of each group are (X1, Y1, Z1), (X2, Y2, Z2), (X3, Y3, Z3) and (X4, Y4, Z4) respectively, then the first characteristic value is expressed by the following equation:

$$\lambda_i = (A\%, B\%, C\%, D\%) * \begin{bmatrix} X1 & Y1 & Z1 \\ X2 & Y2 & Z2 \\ X3 & Y3 & Z3 \\ X4 & Y4 & Z4 \end{bmatrix}$$

$$= (A\%*X1 + B\%*X2 + C\%*X3 + D\%*X4,$$
$$A\%*Y1 + B\%*Y2 + C\%*Y3 + D\%*Y4,$$
$$A\%*Z1 + B\%*Z2 + C\%*Z3 + D\%*Z4)$$

In the above described load evaluation system for virtual machines, the monitored data processing module is further configured to performing redistribution on the virtual machines according to the performance load values in the one or more virtual machines, thereby realizing an effective utilization of resources.

According to another aspect of the application, a load evaluation method for virtual machines in a cloud environment is provided, comprising: performing aggregated grouping on monitored data obtained from one or more virtual machines in a could data center by using a first KMeans algorithm for each of the one or more virtual machines, each group having a center point coordinate, and calculating a performance characteristic of each virtual machine of the one or more virtual machines according to the grouping and the center point coordinates of individual groups, i.e., a first characteristic value; performing aggregated grouping on the one or more virtual machines using a second KMeans algorithm based on the first characteristic value of each virtual machine, thus determining the characteristic type and performance load value of each virtual machine of the one or more virtual machines, wherein a type parameter K in the first KMeans algorithm is larger than a type parameter in the second KMeans algorithm, an initial center of the first KMeans algorithm is selected so that a distance that is as far as possible is kept between initial types, and an initial center of the second KMeans algorithm is selected to be a subset of the initial center of the first KMeans algorithm.

In the above described method, the monitored data is associated with a central processing unit, a memory, hard disk input or output, and network input or output of one or more virtual machines.

In the above described method, the characteristic type of the virtual machine comprises CPU-intensive type, Network-intensive type and Memory-intensive type.

In the above described method, the type parameter K in the first KMeans algorithm is equal to 4, and the type parameter K in the second KMeans algorithm is equal to 3.

In the above described method, the initial center of the first KMeans algorithm is selected to be P1 (100,0,0), P2 (0,100,0), P3 (0,0, 100) and P4 (0,0,0).

In the above described method, the proportions of samples in each group is A %, B %, C % and D %, and the center coordinates of each group are (X1, Y1, Z1), (X2, Y2, Z2), (X3, Y3, Z3) and (X4, Y4, Z4) respectively, then the first characteristic value is expressed by the following equation:

$$\lambda_i = (A\ \%, B\ \%, C\ \%, D\ \%) * \begin{bmatrix} X1 & Y1 & Z1 \\ X2 & Y2 & Z2 \\ X3 & Y3 & Z3 \\ X4 & Y4 & Z4 \end{bmatrix}$$

$$= (A\ \%*X1 + B\ \%*X2 + C\ \%*X3 + D\ \%*X4,$$
$$A\ \%*Y1 + B\ \%*Y2 + C\ \%*Y3 + D\ \%*Y4,$$
$$A\ \%*Z1 + B\ \%*Z2 + C\ \%*Z3 + D\ \%*Z4)$$

The above described method may further comprise performing redistribution on the virtual machines according to the performance load values in the one or more virtual machines, thereby realizing an effective utilization of resources.

According to further another aspect of the application, a service node comprising the above described load evaluation system for virtual machines is provided.

The application realizes evaluating and monitoring a macro state of virtual machine loads by using KMeans aggregation algorithm, and overcomes the influences on the accuracy of aggregation result caused by many factors (including selection of initial center, whether the noise and isolated points are handled) which traditional KMeans algorithms suffered from, etc.

BRIEF DESCRIPTION OF THE DRAWINGS

Various aspects of the invention will become more clearly apparent to those skilled in the art upon reading the specific embodiments of the invention with reference to the accompanying drawings. It should be understood by those skilled in the art that these drawings are merely provided for the purpose of explaining the technical solutions of the invention in conjunction with specific embodiments, and are not intended to limit the scope of protection of the invention.

DETAILED DESCRIPTION OF THE INVENTION

Some of a plurality of possible embodiments of the invention will be described below with the purpose of providing a basic understanding of the invention rather than identifying key elements or crucial elements of the invention or limiting the scope of protection. It can be easily understood that according to the technical solution of the invention, those skilled in the art can propose other implementations that can be replaced with each other without departing from the true spirit of the invention. Therefore, the following specific embodiments and drawings are merely exemplary description of the technical solutions of the invention, and should not be considered as the entirety of the invention or as limiting or restricting the technical solutions of the invention.

Figure 1:
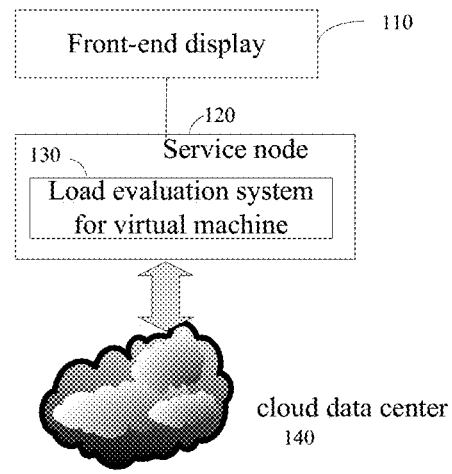
FIG. 1 is a schematic view of a cloud platform application environment comprising a load evaluation system for virtual machines according to an embodiment of the invention.

FIG. 1 is a schematic view of a cloud platform application environment comprising a load evaluation system for virtual machines according to an embodiment of the invention. In FIG. 1, a user deploys relevant application services on one or more virtual machine examples in a cloud data center 140 such as Openstack or the like. Relevant data of the application services is the target to be collected by a virtual machine load evaluation system 130 in the service node 120, comprising data sources such as CPU, Memory, disk I/O and network IO or the like, and then the data collected by the virtual machine load evaluation system 130 is processed and analyzed, and an analysis result is returned to a front-end display module 110.

Figure 2:
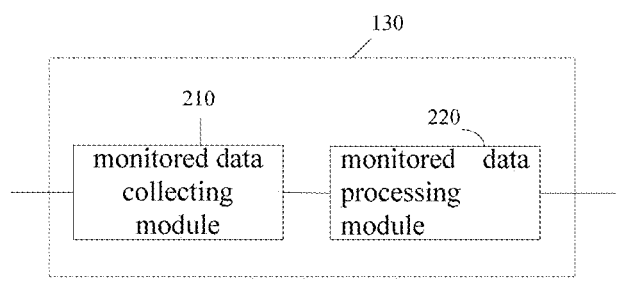
FIG. 2 is a schematic view showing the architecture of the load evaluation system for virtual machines according to the embodiment of the invention.

FIG. 2 is a schematic view showing the architecture of the load evaluation system for virtual machines according to the embodiment of the invention. In combination with FIG. 1, a monitored data collecting module 210 in the virtual machine load evaluation system 130 is responsible for collecting data from the cloud data center 140 and providing the collected data to a monitored data processing module 220. The monitored data processing module 220 processes and analyzes the data according to a solution for processing performance data of virtual machine as described below, and returns an analysis result to the front-end display module 110.

The processing of virtual machine performance data is mainly divided into two parts, wherein a first part is to calculate a characteristic value of the virtual machine by using an improved KMeans algorithm in a cloud environment, and recent performance characteristic (characteristic value) of the virtual machine is obtained through a performance load evaluation algorithm, and a second part is to calculate characteristic behaviors of all the virtual machines, which is mainly divided into three types, i.e., CPU-limited type, Network-limited type and Memory—limited type, and the performance load value of the virtual machine is obtained on basis of this, thereby elevating the type of application according to an aggregation result.

In a specific embodiment, a type parameter K of the improved KMeans algorithm is selected to be 4. The fact that the algorithm is sensitive to "noise" and "isolated point" is mainly taken into consideration. Therefore, on the basis of virtual machine characteristic behaviors in three common cloud environments, a cluster is added so as to incorporate noise and isolated points into this cluster (most noises and isolated points come from virtual machine examples which have no loads in some situations), thus avoiding an influence on the final aggregation result caused by such type of points and improving an accuracy of aggregation result. In the improved KMeans algorithm, the selection of initial center follows the principle below: in order to keep the obviousness in the cluster, all the distances between selected centers must be far. Such a solution can well eliminate the influence caused by quasi edge points and noise points, and can adapt to a situation in which data is concentrated and the distribution of densities of various actual types is not even; finally, a better aggregation result is obtained, and the utilization of virtual machine resources can be accurately obtained.

A specific algorithm of the improved KMeans algorithm is described as follows:

1) K sample points are selected purposeful (the selection of initial centers in traditional KMean algorithm has randomness) in a data set A of all the sample points according to known conditions, and the values of K sample point are given to initial aggregation centers ($\mu_1^{(1)}$, $\mu_2^{(2)}$, $\mu_3^{(3)}$, . . . , $\mu_k^{(k)}$) respectively;

2) in the $j^{th}$ iteration, an Euclidean distance d(t,i) to individual aggregation centers $\mu_i^{(j)}$ is calculated for all the sample points Pt(t=1, 2, 3 . . . , n) in the sample set A $$d(t,i) = \sqrt{(P_t - \mu_t^{(j)})^2}$$

3) a minimum distance from Pt to $\mu_t^{(j)}$ is found, and Pt is classified into a cluster in which the distances as to $\mu_t^{(j)}$ are smallest;

4) the aggregation centers of various clusters are updated $$\mu_i^{(j+1)} = \frac{1}{n} \sum_{t=1}^{u_t} P_{it}$$

5) a square error Ei of al the points in the data set A is calculated and is compared to a previous error $E_{i-1}$ $$E_i = \sum_{i=1}^{k} \sum_{t=1}^{m_i} |P_{it} - \mu_i^{j+1}|$$

If $|E_{i+1} - E_i| < \delta$, then the algorithm is completed; otherwise, the algorithm goes to 2) for the iteration once again.

In an embodiment, the evaluation is divided into two phases. In the first phase, each virtual machine is improved according to data samples, and then KMeans operation is executed; the KMeans operation requires two variables to be determined, one of which is the number K of the types of characteristic values (K=4 according to the above analysis), and the other one of which is the selection of K initial center points. The selection of initial centers adopts the max-min distance method for center selection. The principle of this method is that a far enough distance should be kept between initial types to the greatest possibility, and the performances of virtual machine's characteristic values in the cloud environment are relatively obvious. Therefore, the centers of the type are selected to be P1 (100,0,0), P2 (0,100,0), P3 (0,0, 100) and P4 (0,0,0).

Finally, all the sample points can be divided into four classes:

| proportion of each type of sample | coordinate of center point of each type |
|---|---|
| A % | (X1, Y1, Z1) |
| B % | (X2, Y2, Z2) |
| C % | (X3, Y3, Z3) |
| D % | (X4, Y4, Z4) |

From the above four types, it can be seen that a large quantity of sample points are aggregated in one type, and this aggregated point can be characteristic of recent performance of this virtual machine.

$$\lambda_i = (A\%, B\%, C\%, D\%) * \begin{bmatrix} X1 & Y1 & Z1 \\ X2 & Y2 & Z2 \\ X3 & Y3 & Z3 \\ X4 & Y4 & Z4 \end{bmatrix}$$

$$= (A\% * X1 + B\% * X2 + C\% * X3 + D\% * X4,$$

$$A\% * Y1 + B\% * Y2 + C\% * Y3 + D\% * Y4,$$

$$A\% * Z1 + B\% * Z2 + C\% * Z3 + D\% * Z4)$$

In a second phase, the KMeans algorithm is once again executed on the characteristic vectors of all the virtual machines obtained in the first phase, and for this time, K=3. Since the characteristic vectors of all the virtual machines are obtained through a lot of sample points, characteristic vectors that are close to 0 (noise points) can be substantially omitted. At this point, an aggregated grouping can be performed on the virtual machines, and the aggregated point in each group is also aggregated from three initial points, just like the first phase. Moreover, the three aggregated points exhibit three characteristics: CPU-intensive type, Network-intensive type and Memory-intensive type. The application types can be grasped in a macro sense according to the type of the characteristic vector of each virtual machine so that an effective formulating of the strategy of resource utilization can be realized.

A quantization processing is performed on the performance loads of virtual machine by using improved KMeans algorithm in this technical solution. As compared to current load evaluation which merely relies on a macro operating state of virtual machine and single threshold control and lacks quantization process, this technical solution can realize a more complete and accurate quantization evaluation for the system through a comprehensive analysis on specific data, and can effectively determine the type of application according to the specific data and can quantify and refine load characteristics, and the accuracy rate of load evaluation is improved by approximately 20%.

In addition to an effective improvement on the accuracy of performance evaluation of virtual machines, the present technical solution can also obtain a macro application type (e.g., CPU-occupied type application cluster, memory-occupied type application cluster, and network bandwidth-occupied type application cluster) of the current system through aggregation analysis, and can optimize the configurations of virtual machine resources and physical machine resources based on the application type and the condition of virtual machine resources.

The present technical solution can realize a sufficient utilization of virtual machine resources. When different users deploy different application services in a cloud environment, the application services exhibit different characteristics during operation. The users may not be able to describe the characteristics of the application services quantitatively or qualitatively in advance. With this evaluation system, the specific characteristic of each application can be quantified, and according to the characteristic value of application, different virtual machine types are assigned to various applications. In this way, it is ensured that the application services will not deteriorate the performance of virtual machines and lower the quality of service due to insufficient virtual machine resources, and also the application services can make full use of the virtual machine resources to provide a corresponding service. The cost incurred in requesting is reduced, and the cloud resource is made full use of, thus avoiding a waste of cloud resource.

The present technical solution can realize a sufficient use of physical machine resources. Through data analysis, the characteristic values $\lambda_1, \lambda_2, \ldots \lambda_M$ of M types of applications are calculated. After these application services mark specific characteristics of application services, the performance loads of three corresponding types of virtual machines can be eventually calculated, whereas in the prior art, virtual machines VM1, VM2 ... VMM on which the application services are running are irregularly running on N physical machine nodes. In this situation, it is possible that virtual machines of the same type (e.g., CPU-intensive virtual machines) are all running on the same physical node. As a result, this node has a high occupancy of CPU resource, and the memory resource and Network resource are used very little, causing an uneven distribution of resources and waste. Even worse, it is possible that the quality of service of virtual machines is lowered due to resource seizing on all the virtual machines on the node. However, by quantifying performance loads on the virtual machines (application services), the performance load values on all the virtual machines are: Load(V1) Load(V2) ... Load(Vm), and the virtual machines are divided into three types (e.g., CPU-intensive type, Network-intensive type and Memory-intensive type). In this way, the virtual machines can be re-distributed according to performance load values of the virtual machines. That is, an effective migration of virtual machine can be realized so that the above problem of waste of physical machine resources or insufficient physical machine resources is solved.

To sum up, the application applies aggregation analysis method to a cloud environment so as to indicate the type of virtual machines which faces application services. In this way, the disadvantage in a traditional KMeans algorithm that the aggregation result is relevant to the selection of initial center and often ends up with a local optimization, and all the points get an empty cluster without being distributed into a certain cluster in the distribution step or the like can be eliminated. The application also designs an improved KMeans algorithm which is more adapted to the cloud environment.

It is pointed out that in the above embodiment, the characteristic types of virtual machines comprise CPU-intensive type, Network-intensive type and Memory-intensive type. However, those skilled in the art can increase or decrease the types of virtual machines as actually required, or can dynamically expand the types of virtual machines. For example, in other embodiments, there are four characteristic types of virtual machines, i.e., CPU-intensive type, Network-intensive type, Memory-intensive type and Hard disk-intensive type.

The specific embodiments of the invention have been described above with reference to the drawings. However, those skilled in the art will understand that without departing from the spirit and scope of the invention, various modifications and replacements can be also made on the specific embodiments of the invention, which will also fall within the scope of the invention defined by the appended claims.

The invention claimed is:

1. A load evaluation system for virtual machines in a cloud environment, comprising:
   a monitored data collecting module which is configured to collect monitored data from one or more virtual machines in a cloud data center; and
   a monitored data processing module which is coupled with the monitored data collecting module and is configured to:
     perform aggregated grouping on the monitored data by using a first KMeans algorithm for each of the one or more virtual machines, each group having a center point coordinate, and calculate a performance characteristic of each virtual machine of the one or more virtual machines according to the grouping and the center point coordinates of individual groups, i.e., a first characteristic value;
     perform aggregated grouping on the one or more virtual machines using a second KMeans algorithm based on the first characteristic value of each virtual machine, thus determining a characteristic type and performance load value of each virtual machine of the one or more virtual machines,
   wherein a type parameter K in the first KMeans algorithm is larger than a type parameter in the second KMeans algorithm, an initial center of the first KMeans algorithm is selected so that a distance that is as far as possible is kept between initial types, and an initial center of the second KMeans algorithm is selected to be a subset of the initial center of the first KMeans algorithm;
   wherein the type parameter K in the first KMeans algorithm is equal to 4, the type parameter K in the second KMeans algorithm is equal to 3, and the proportions of samples in each group is A %, B %, C % and D %, and the center coordinates of each group are (X1, Y1, Z1), (X2, Y2, Z2), (X3, Y3, Z3) and (X4, Y4, Z4) respectively, then the first characteristic value is expressed by the following equation:

$$\lambda_i = (A\ \%, B\ \%, C\ \%, D\ \%) * \begin{bmatrix} X1 & Y1 & Z1 \\ X2 & Y2 & Z2 \\ X3 & Y3 & Z3 \\ X4 & Y4 & Z4 \end{bmatrix}$$

$$= (A\ \% * X1 + B\ \% * X2 + C\ \% * X3 + D\ \% * X4,$$

$$A\ \% * Y1 + B\ \% * Y2 + C\ \% * Y3 + D\ \% * Y4,$$

$$A\ \% * Z1 + B\ \% * Z2 + C\ \% * Z3 + D\ \% * Z4).$$

2. The load evaluation system for virtual machines according to claim 1, wherein the monitored data is associated with a central processing unit, a memory, hard disk input or output, and network input or output of one or more virtual machines.

3. The load evaluation system for virtual machines according to claim 1, wherein the characteristic type of the virtual machine comprises CPU-intensive type, Network-intensive type and Memory-intensive type.

4. The load evaluation system for virtual machines according to claim 1, wherein the initial center of the first KMeans algorithm is selected to be P1 (100,0,0), P2 (0,100, 0), P3 (0,0, 100) and P4 (0,0,0).

5. The load evaluation system for virtual machines according to claim 1, wherein the monitored data processing module is further configured to performing redistribution on the virtual machines according to the performance load values in the one or more virtual machines, thereby realizing an effective utilization of resources.

6. A load evaluation method for virtual machines in a cloud environment, comprising:

performing aggregated grouping on monitored data obtained from one or more virtual machines in a could data center by using a first KMeans algorithm for each of the one or more virtual machines, each group having a center point coordinate, and calculating a performance characteristic of each virtual machine of the one or more virtual machines according to the grouping and the center point coordinates of individual groups, i.e., a first characteristic value;

performing aggregated grouping on the one or more virtual machines using a second KMeans algorithm based on the first characteristic value of each virtual machine, thus determining a characteristic type and performance load value of each virtual machine of the one or more virtual machines, wherein a type parameter K in the first KMeans algorithm is larger than a type parameter in the second KMeans algorithm, an initial center of the first KMeans algorithm is selected so that a distance that is as far as possible is kept between initial types, and an initial center of the second KMeans algorithm is selected to be a subset of the initial center of the first KMeans algorithm;

wherein the type parameter K in the first KMeans algorithm is equal to 4, the type parameter K in the second KMeans algorithm is equal to 3, and the proportions of samples in each group is A %, B %, C % and D %, and the center coordinates of each group are (X1, Y1, Z1), (X2, Y2, Z2), (X3, Y3, Z3) and (X4, Y4, Z4) respectively, then the first characteristic value is expressed by the following equation:

$$\lambda_i = (A\ \%, B\ \%, C\ \%, D\ \%) * \begin{bmatrix} X1 & Y1 & Z1 \\ X2 & Y2 & Z2 \\ X3 & Y3 & Z3 \\ X4 & Y4 & Z4 \end{bmatrix}$$

$$= (A\ \%*X1 + B\ \%*X2 + C\ \%*X3 + D\ \%*X4,$$
$$A\ \%*Y1 + B\ \%*Y2 + C\ \%*Y3 + D\ \%*Y4,$$
$$A\ \%*Z1 + B\ \%*Z2 + C\ \%*Z3 + D\ \%*Z4).$$

7. The method according to claim 6, wherein the monitored data is associated with a central processing unit, a memory, hard disk input or output, and network input or output of one or more virtual machines.

8. The method according to claim 6, wherein the characteristic type of the virtual machine comprises CPU-intensive type, Network-intensive type and Memory-intensive type.

9. The method according to claim 6, wherein the initial center of the first KMeans algorithm is selected to be P1 (100,0,0), P2 (0,100,0), P3 (0,0, 100) and P4 (0,0,0).

10. The method according to claim 6, further comprising performing redistribution on the virtual machines according to the performance load values in the one or more virtual machines, thereby realizing an effective utilization of resources.

* * * * *